United States Patent
Grover

Patent Number: 5,540,949
Date of Patent: Jul. 30, 1996

[54] METHOD FOR CUTTING THREADS IN A CARBON-CARBON STRUCTURE

[75] Inventor: Curtis B. Grover, Tremonton, Utah

[73] Assignee: The United States of America as represented by the Secretary of the Air Force, Washington, D.C.

[21] Appl. No.: 855,244

[22] Filed: Apr. 24, 1986

[51] Int. Cl.[6] .................... B32B 7/00; B32B 9/00
[52] U.S. Cl. .............. 427/221; 427/249; 428/408; 239/265.11
[58] Field of Search .................. 427/221, 249; 239/265.11; 428/408

[56] References Cited

U.S. PATENT DOCUMENTS

| | | | |
|---|---|---|---|
| 4,063,684 | 12/1977 | O'Brien et al. | 236/265.11 |
| 4,201,611 | 5/1980 | Stover | 427/249 X |
| 4,343,836 | 8/1982 | Newkirk et al. | 427/299 X |
| 4,392,624 | 7/1983 | Myer | 428/408 X |
| 4,400,421 | 8/1983 | Stover | 428/364 X |
| 4,477,024 | 10/1984 | O'Driscoll et al. | 239/265.11 |
| 4,519,290 | 5/1985 | Inman et al. | 87/7 |
| 4,522,883 | 6/1985 | Wallace et al. | 428/368 X |

*Primary Examiner*—Peter A. Nelson
*Attorney, Agent, or Firm*—Charles E. Bricker; Thomas L. Kundert

[57] ABSTRACT

The cutting of attachment threads in a carbon-carbon billet is improved by coating the portion to be threaded with an epoxy resin, and at least partially curing the resin prior to cutting the threads.

4 Claims, 1 Drawing Sheet

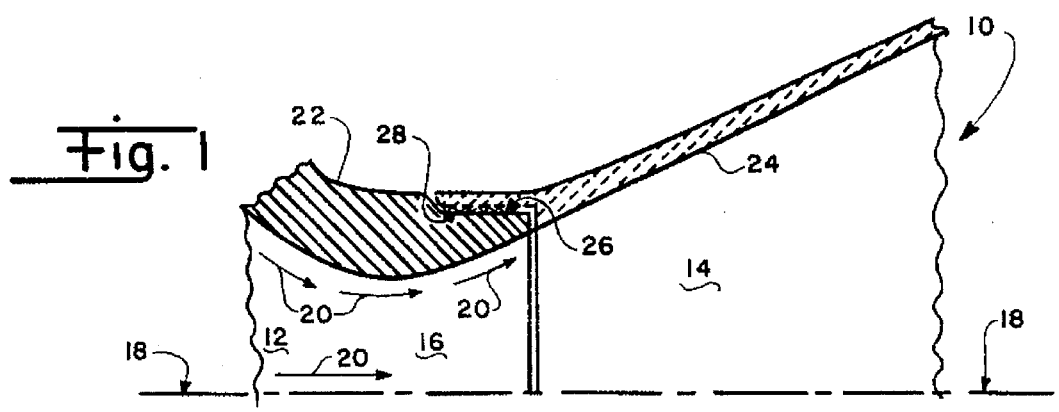
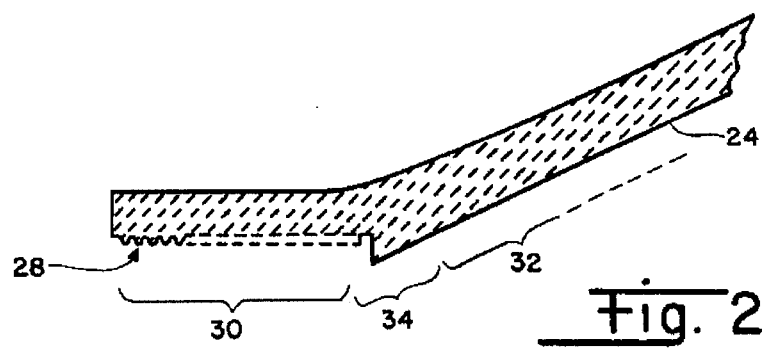
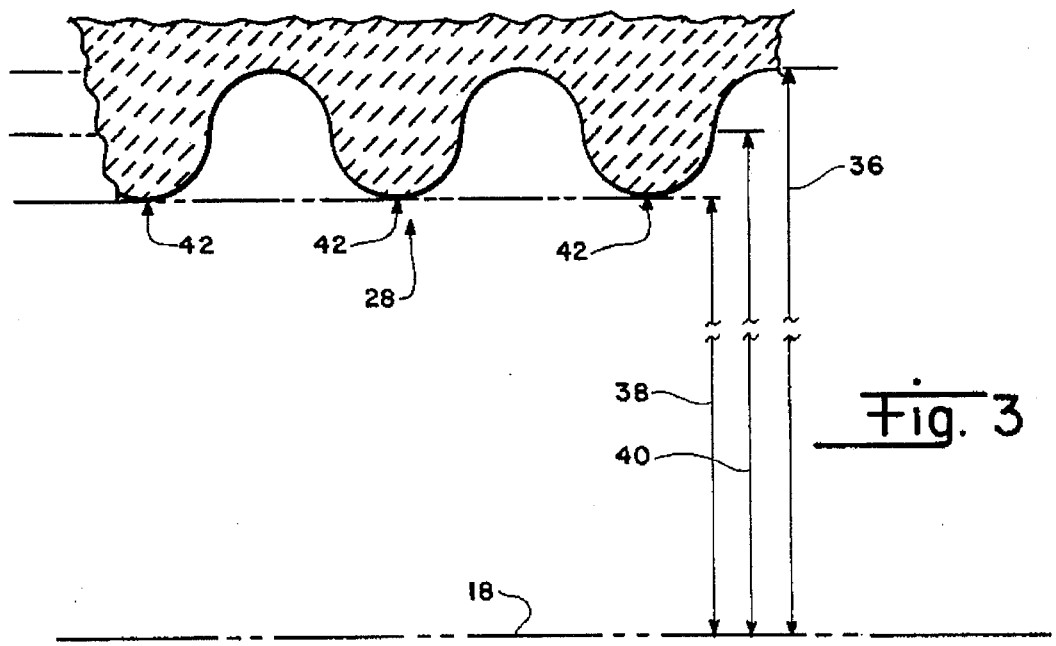

METHOD FOR CUTTING THREADS IN A CARBON-CARBON STRUCTURE

RIGHTS OF THE GOVERNMENT

The invention described herein may be manufactured and used by or for the Government of the United States for all governmental purposes without the payment of any royalty.

BACKGROUND OF THE INVENTION

This invention relates to machining a carbon-carbon structure.

In recent years, solid rocket motor assemblies have undergone a material transition. Initially, for example, common structural materials, such as steel, aluminum, and fiberglass were used to fabricate exit cones, with insulation to protect these materials from the high temperatures of the rocket motor exhaust. More recently, carbon-carbon exit cones have been developed. These structures can carry the operating pressures and thermal loads of solid rocket motors while operating at temperatures in the range of 4000° to 5000° F. (2200° to 2750° C.).

Several methods are available for fabricating carbon-carbon exit cones. According to the method outlined by O'Driscoll et al, U.S. Pat. No. 4,477,024, a conventional (2D) woven carbon fiber fabric is impregnated with a suitable resin, such as a phenolic resin, and the resin-impregnated fabric is assembled in suitable fashion upon a male mandrel. The uncured laminate is transferred to a female die for curing and the male mandrel is withdrawn. Following curing of the resin, the now freestanding preform can be skin machined and prepared for carbonization.

According to another procedure, described by Inman et al, U.S. Pat. No. 4,519,290, carbon fiber strands are braided over a male mandrel. The braided preform is rigidized on the mandrel and prepared for carbonization.

The fiber preform is impregnated with pitch in a vacuum, and then subjected to heat and pressure to produce carbonization. This process is repeated until the structure has the desired density. The billet that is thus formed is machined to achieve the desired dimensions and finish of the final product.

The carbon-carbon exit cones present certain problems in manufacturing. In order to attach these cones to the rest of the motor structure, i.e., to the throat portion of the rocket motor, a threaded cylindrical section is required. I have found that in machining this threaded section, small portions of fiber chip out of the thread surface, particularly in the crest of the thread, leaving surface defects. Lest these thread defects lead to operational failure of the exit cone, I have discovered a method for machining non-defective threads in the attachment portion of a carbon-carbon rocket motor exit cone. More broadly, my discovery is applicable to the machining of threads in a carbon-carbon billet.

Accordingly, it is an object of the present invention to provide a method for machining threads in a carbon-carbon billet.

Other objects and advantages of the present invention will be apparent to those skilled in the art.

DESCRIPTION OF THE DRAWINGS

In the drawings,

FIG. 1 is a view of a longitudinal section of a portion of a solid rocket motor discharge nozzle assembly;

FIG. 2 is an enlarged view of a portion of the exit nozzle shown in FIG. 1, and

FIG. 3 is an enlarged view of the threaded portion of the portion shown in FIG. 2.

DESCRIPTION OF THE PREFERRED EMBODIMENT

Although the present invention can be employed for cutting threads in any carbon-carbon structure, it will be described with reference to a rocket motor exit cone. Referring now to the drawing, FIG. 1 illustrates a rocket motor discharge nozzle assembly 10 which comprises a converging entrance section 12, a diverging exit section 14 and located therebetween, throat section 16. Also shown is the nozzle assembly longitudinal axis 18, and as indicated by the arrows 20, the direction of gaseous flow from the entrance section 12, through the throat section 16, to the exit section 14.

The throat section 16 and a portion of the entrance section 12 are formed by an integral throat and entrance piece 22, which is illustrated as being fabricated from a metal; however, piece 22, may be fabricated from any high temperature and ablation resistant material known in the art. The exit section 14 includes a carbon-carbon composite exit cone 24 which is connected to the throat and entrance piece 22 by a threaded connection comprising outside threads 26 on the throat and entrance piece 22 and inside threads 28 on the exit cone 24.

Referring now to FIG. 2, the exit cone 24 has a cylindrical portion 30, a diverging conical portion 32, and therebetween, a transition portion 34. The exit cone 24 is fabricated in accordance with procedures known in the art. Cone 24 is fabricated oversize so that it can be machined to final dimensions, including the inside threads 28.

Referring now to FIG. 3, a portion of the screw threads 28 are illustrated. Reference numeral 36 indicates the major diameter of the outside threads 26 of throat piece 22, while reference numerals 38 and 40 indicate the minor diameter and pitch diameter, respectively, all relative to the longitudinal axis 18. Heretofore, when machining the threads 28, problems have been experienced, in that fibers at the crest 42 of the thread 28 fall out or are knocked loose by the threading tool, not illustrated, leaving a surface defect, I have discovered that these defects can be minimized, if not fully eliminated, by the steps of machining the exit cone billet to its nearly final dimensions, coating the portion to be threaded with a suitable epoxy resin, at least partially curing the resin, and thereafter cutting the threads 28, employing thread-cutting techniques known in the art. A suitable resin is EA934, a two-part epoxy resin available commercially from The Dexter Corporation, Hysol Division, Pittsburgh, Calif. The resin is mixed, applied to the billet using a suitable brush or other applicator, then at least partially cured using a locally directed heat source such as a portable heat lamp or heat gun.

While the invention has been illustrated and described with reference to internal threads on a carbon-carbon exit cone, those skilled in the art will recognize that the invention is equally applicable to the cutting of external threads, as well as to the cutting of internal or external threads on other carbon-carbon structures.

Various modifications may be made without departing from the spirit of the invention or the scope of the following claims.

I claim:

1. In a process for fabricating a carbon-carbon structure comprising the steps of fabricating a carbon fiber preform, densifying said preform to provide a carbon-carbon billet, and machining said billet to its final dimensions including cutting threads in a portion of said billet for attaching said structure to another structure, the improvement which comprises coating said billet in the region where said threads are to be cut with an epoxy resin, at least partially curing said resin and thereafter cutting said threads.

2. The process of claim 1 wherein said threads are internal.

3. The process of claim 1 wherein said threads are external.

4. The process of claim 1 wherein said structure is a solid rocket motor exit cone.

* * * * *